United States Patent [19]
Nishikawa et al.

[11] Patent Number: 5,211,011
[45] Date of Patent: May 18, 1993

[54] CONTROL APPARATUS FOR RAPIDLY WARMING UP CATALYST IN INTERNAL COMBUSTION ENGINE

[75] Inventors: Seiithirou Nishikawa; Toshiaki Kikuchi; Masumi Kinugawa, all of Okazaki, Japan

[73] Assignee: Nippondenso Co., Ltd., Kariya, Japan

[21] Appl. No.: 833,651

[22] Filed: Feb. 11, 1992

[30] Foreign Application Priority Data
Feb. 12, 1991 [JP] Japan .................. 3-18695
Jun. 21, 1991 [JP] Japan .................. 3-150640

[51] Int. Cl.$^5$ ................................ F01N 3/20
[52] U.S. Cl. .......................... 60/284; 60/285
[58] Field of Search .............. 60/274, 285, 284

[56] References Cited
U.S. PATENT DOCUMENTS

| | | | |
|---|---|---|---|
| 3,751,941 | 8/1973 | Pollock | 60/284 |
| 3,813,877 | 6/1974 | Hunt | 60/284 |
| 4,007,590 | 2/1977 | Nagai | 60/284 |
| 4,132,198 | 1/1979 | Masaki | 60/285 |
| 4,351,297 | 9/1982 | Suematsu . | |
| 4,379,387 | 4/1983 | Iizuka | 60/285 |
| 4,574,588 | 3/1986 | Hayama | 60/285 |
| 4,617,793 | 10/1986 | Suzuki | 60/285 |

FOREIGN PATENT DOCUMENTS

| | | |
|---|---|---|
| 51-74106 | 6/1976 | Japan . |
| 51-121607 | 10/1976 | Japan . |
| 51-44247 | 11/1976 | Japan . |
| 51-126404 | 11/1976 | Japan . |
| 52-10703 | 3/1977 | Japan . |
| 62-247176 | 10/1987 | Japan . |

OTHER PUBLICATIONS

Nakabayashi Katsuhiko; Air-fuel Ratio Control System; Patent Abstracts of Japan; Feb. 17, 1983; vol. 007, No. 98.
Sawamoto Hiroyuku; Air-Fuel Ratio Control Device for Internal Combustion Engine; Patent Abstracts of Japan; Jan. 24, 1991; vol. 015, No. 134.
Morikawa Koji; Engine Control Device of Two-Cycle Engine; Patent Abstracts of Japan; Jul. 16, 1983; vol. 015, No. 400.
Sakurai Shigenori; Apparatus for Purifying Exhaust Gas of Engine; Patent Abstracts of Japan; Mar. 22, 1983; vol. 007, No. 133.
Uchinami Masanobu; Air-fuel Ratio Controller; Patent Abstracts of Japan; Feb. 15, 1990; vol. 014, No. 209.
Ihara Kazunori; Exhaust Gas Purifying Device for Engine; Patent Abstracts of Japan; Aug. 30, 1991; vol. 015, No. 463.
Torio Kazuo; Catalyst Warmer of Automobile Engine; Patent Abstracts of Japan; Oct. 1982; vol. 007, No. 009.

Primary Examiner—Douglas Hart
Attorney, Agent, or Firm—Cushman, Darby & Cushman

[57] ABSTRACT

A control apparatus for rapidly warming up a catalyst disposed within an exhaust pipe connected to an internal combustion engine. The control apparatus first determines a fuel injection amount and an ignition timing of the engine on the basis of an engine operating condition such as an intake air pressure of the engine and a rotational speed of the engine. The control apparatus is also responsive to temperature information of the catalyst for adjusting the fuel injection amount and the ignition timing in accordance with the catalyst temperature information. When the catalyst temperature does not reach the effective emission-purifying temperature, the control apparatus alternately adjusts the fuel injection amount to a rich amount and a lean amount and further intermittently retards the ignition timing. This injection and ignition control operation allows acceleration of the warming-up of the catalyst to suppress the deterioration of the emissions from the engine.

17 Claims, 12 Drawing Sheets

CONTROL APPARATUS FOR RAPIDLY WARMING UP CATALYST IN INTERNAL COMBUSTION ENGINE

BACKGROUND OF THE INVENTION

1. Field of the Invention

The present invention relates to a control apparatus for speedily warming up a catalyst for purification of emissions generated from an internal combustion engine (which will be referred hereinafter to as an engine).

2. Description of the Related Art

Various types of devices have been proposed which control the ignition timing where an engine is started in a cooled state, thereby decreasing the maximum combustion temperature and increasing the temperature of emissions (exhaust gases) from the engine to reduce the hazardous components (HC, NOx) being discharged from the engine. For example, according to the Japanese patent Publication No. 62-39269, the ignition timing is retardation-corrected in accordance with the cooling water temperature when the engine is started in a cooled state, and when the cooling water temperature reaches a predetermined temperature lower than the temperature corresponding to the fully warmed-up state of the engine, the retardation amount is decreased in accordance with the time period that elapses from the time that it reaches the predetermined temperature so as to accelerate the increase in the emission temperature to speedily warm up the catalyst for purifying the emissions.

There is a problem which arises with the aforementioned device, however, in that difficulty is encountered in setting the retardation amount to a large value because the retardation of the ignition timing causes reduction of the engine torque, thereby making it difficult to sufficiently warm up the catalyst due to the increase in the emission temperature resulting from the retardation control thus requiring a long time period until reaching the temperature (the warming-up completing temperature) which allows the sufficient purification of the hazardous components of the emissions through the catalyst. This causes a problem in which the hazardous components are discharged into the atmosphere because of the insufficient purification action of the catalyst until the catalyst temperature reaches the warming-up completing temperature.

SUMMARY OF THE INVENTION

It is therefore an object of the present invention to provide an engine control apparatus which is capable of quickly warming-up the catalyst to reduce the discharged amount of the hazardous components of the emissions into the atmosphere.

In accordance with the present invention, there is provided an internal combustion engine control apparatus comprising: engine operating condition detecting means for detecting an operating condition of an internal combustion engine; fuel injection amount determining means for determining an appropriate fuel injection amount to obtain an appropriate air-fuel ratio based on the engine operating condition detected by the engine operating condition detecting means; a catalyst disposed within an exhaust pipe connected to the engine so as to purify emissions generated from the engine; and temperature condition determining means for determining whether a temperature of the catalyst becomes an operating temperature at which the catalyst can effectively purify the emissions. The apparatus further comprises adjusting means for adjusting the determined fuel amount in accordance with a determination of the temperature condition determining means that the catalyst temperature is lower than the operating temperature, so that the determined fuel amount is alternately adjusted to a rich amount and a lean amount with respect to the air-fuel ratio.

In accordance with this invention, there is also provided an internal combustion engine control apparatus comprising: engine operating condition detecting means for detecting an operating condition of an internal combustion engine; ignition timing determining means for determining an appropriate ignition timing of the engine based on the engine operating condition detected by the engine operating condition detecting means; a catalyst disposed within an exhaust pipe connected to the engine so as to purify emissions generated from the engine; and temperature condition determining means for determining whether a temperature of the catalyst reaches an operating temperature at which the catalyst can effectively purify the emissions. The apparatus further comprises retarding means for intermittently retarding the determined ignition timing in accordance with a determination of the temperature condition determining means that the catalyst temperature is lower than the operating temperature.

According to this invention, there is further provided an internal combustion engine control apparatus comprising: engine operating condition detecting means for detecting an operating condition of an internal combustion engine; fuel injection amount determining means for determining an appropriate fuel injection amount to obtain an appropriate air-fuel ratio based on the engine operating condition detected by the engine operating condition detecting means; ignition timing determining means for determining an appropriate ignition timing of the engine based on the engine operating condition detected by the engine operating condition detecting means; a catalyst disposed within an exhaust pipe connected to the engine so as to purify emissions generated from the engine; and temperature condition determining means for determining whether a temperature of the catalyst becomes an operating temperature at which the catalyst can effectively purify the emissions. The apparatus further comprises adjusting means for adjusting the determined fuel amount in accordance with a determination of the temperature condition determining means that the catalyst temperature is lower than the operating temperature, so that the determined fuel amount is alternately adjusted to a rich amount and a lean amount with respect to the air-fuel ratio; and retarding means for retarding the determined ignition timing when the adjusting means adjusts the determined fuel amount to the rich amount.

According to this invention, there is further provided an internal combustion engine control apparatus comprising: engine operating condition detecting means for detecting an operating condition of an internal combustion engine; fuel injection amount determining means for determining an appropriate fuel injection amount with regard to a stoichiometric air-fuel ratio based on the engine operating condition detected by the engine operating condition detecting means; ignition timing determining means for determining an appropriate ignition timing of the engine based on the engine operating condition detected by the engine operating condition detecting means; a catalyst disposed within an exhaust pipe connected to the engine so as to purify emissions generated from the engine; and temperature condition determining means for determining whether a temperature of the catalyst becomes an operating temperature at which the catalyst can effectively purify emissions. The invention further comprises adjusting means for adjusting the determined fuel amount in accordance with a determination of the temperature condition determining means that the catalyst temperature is lower than the operating temperature, so that the determined temperature is alternately adjusted to a rich amount and a lean amount with respect to the stoichiometric air-fuel ratio at a first predetermined interval; and retarding means for retarding the determined ignition timing at a second predetermined interval which is shorter than the first interval, while the catalyst temperature is lower than the operating temperature.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
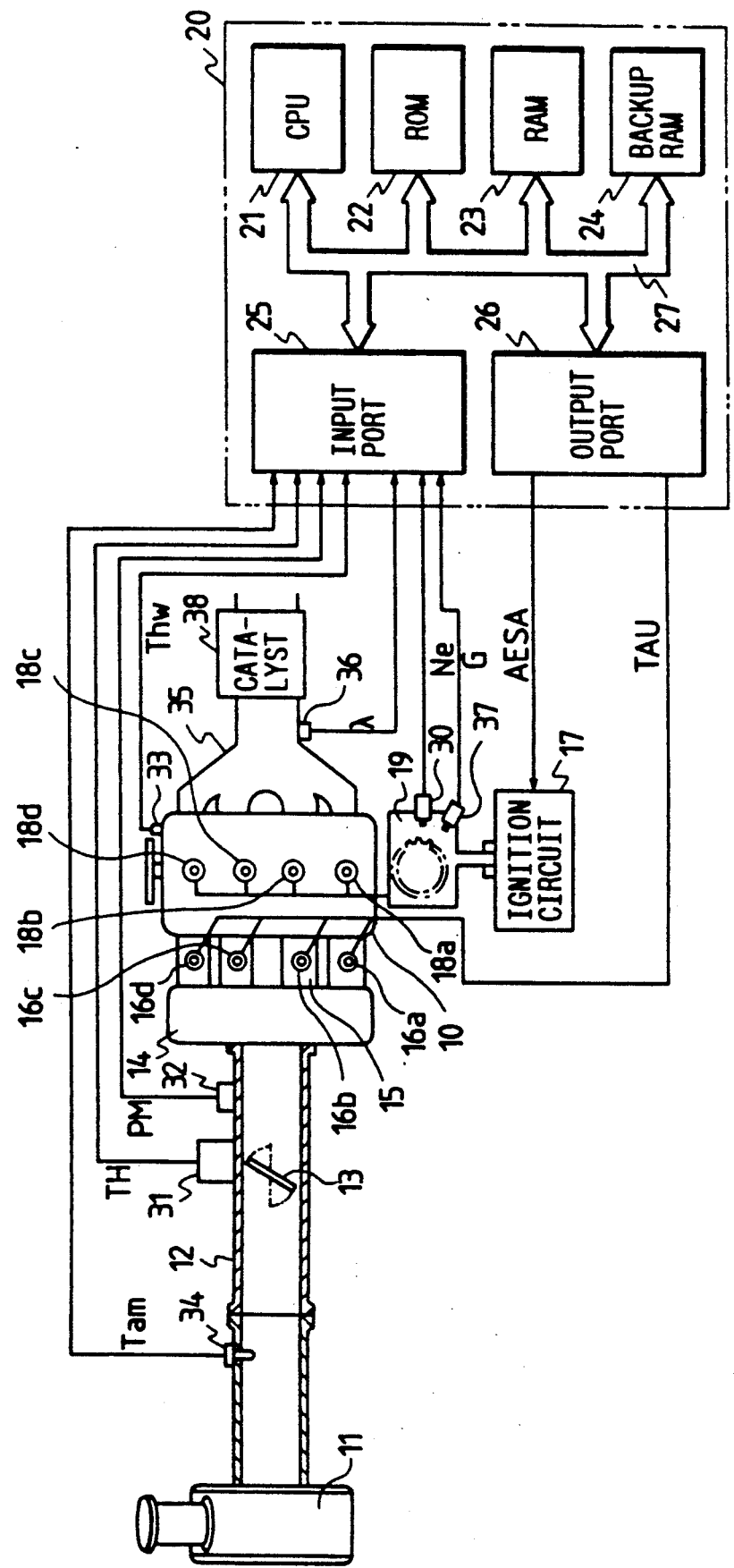
FIG. 1 is a schematic view showing an engine control apparatus according to the present invention which is provided in relation to an engine and the peripheral devices.

FIG. 1 schematically shows an engine control apparatus according to the present invention provided in relation to an engine 10, where the fuel injection control and the ignition timing control of the engine 10 is effected by an electronic control unit (ECU) 20. In FIG. 1, the engine 10 is of the 4-cylinder and 4-cycle spark ignition type, and the intake air introduced from the upstream side through an air cleaner 11, an intake pipe 12, a throttle valve 13, a surge tank 14 and an intake branching pipe 15 into each of the cylinders. On the other hand, fuel is arranged so as to be supplied from a fuel tank (not shown) under pressure and then injected thereinto through fuel injection valves 16a, 16b, 16c and 16d provided in the intake branching pipes 15. Further, the engine 10 is equipped with a distributor 19 for distributing the high-voltage electric signal from an ignition circuit 17 to ignition plugs 18a, 18b, 18c and 18d for the respective cylinders, a rotational speed sensor 30 provided in the distributor 19 for detecting the rotational speed Ne of the engine 10, a cylinder-identifying sensor 37 for identifying the cylinders of the engine 10, a throttle sensor 31 for detecting the opening degree TH of the throttle valve 13, an intake air pressure sensor 32 for detecting an intake air pressure PM at a downstream side of the throttle valve 13, a warming-up sensor 33 for detecting the temperature of the cooling water of the engine 10, and an intake air temperature sensor 34 for detecting an intake air temperature Tam.

The aforementioned rotational speed sensor 30 is provided to oppose a ring gear which rotates in synchronism with the crank shaft of the engine 10 so as to generate 24 pulse signals every two revolutions of the engine 10, i.e., every 720° CA, in proportion to the engine rotational speed Ne. Further, the cylinder-identifying sensor 37 is also provided to oppose the ring gear which rotates in synchronism with the crank shaft of the engine 10 so as to output one pulse signal G at the top dead center of the compression stroke in a predetermined cylinder every two revolutions of the engine 10, i.e., 720° CA. The throttle sensor 31 outputs an analog signal corresponding to the throttle opening degree TH and is equipped with an idle switch for detecting the fully closing state of the throttle valve 13 to output an ON-OFF signal. In an exhaust pipe 35 of the engine 10 there is provided a catalytic converter rhodium 38 for reducing the hazardous components (CP, HC, NOx and others) of the emissions discharged from the engine 10. At the upstream side of the catalytic converter rhodium 38 there is provided an air-fuel ratio sensor 36 which is an oxygen concentration sensor for generating a linear detection signal corresponding to the air-fuel ratio λ of the air-fuel mixture supplied into the engine 10.

The electronic control unit 20 includes well-known CPU 21, ROM 22, RAM 23, backup RAM 24 and others so as to be constructed as an arithmetic and logic unit. These devices are coupled through a bus 27 to an input port 25 for inputting the above-mentioned sensors and further to an output port 26 for outputting a control signal to each of actuators. Through the input port 25, the electronic control unit 20 inputs the intake air pressure PM, intake air temperature Tam, throttle opening degree TH, cooling water temperature Thw, air-fuel ratio λ, rotational speed Ne and others so as to calculate the fuel injection amount TAU and the ignition timing AESA on the basis of the inputted data to output the corresponding control signals through the output port 26 to the fuel injection valves 16a to 16d and the ignition circuit 17. The fuel injection valves 16a to 16d are independently controlled for the injections.

A description will be made hereinbelow in terms of methods of speedily warming up the catalytic converter rhodium 38.

i) Method Based upon Retardation of Ignition Timing

Figure 2:
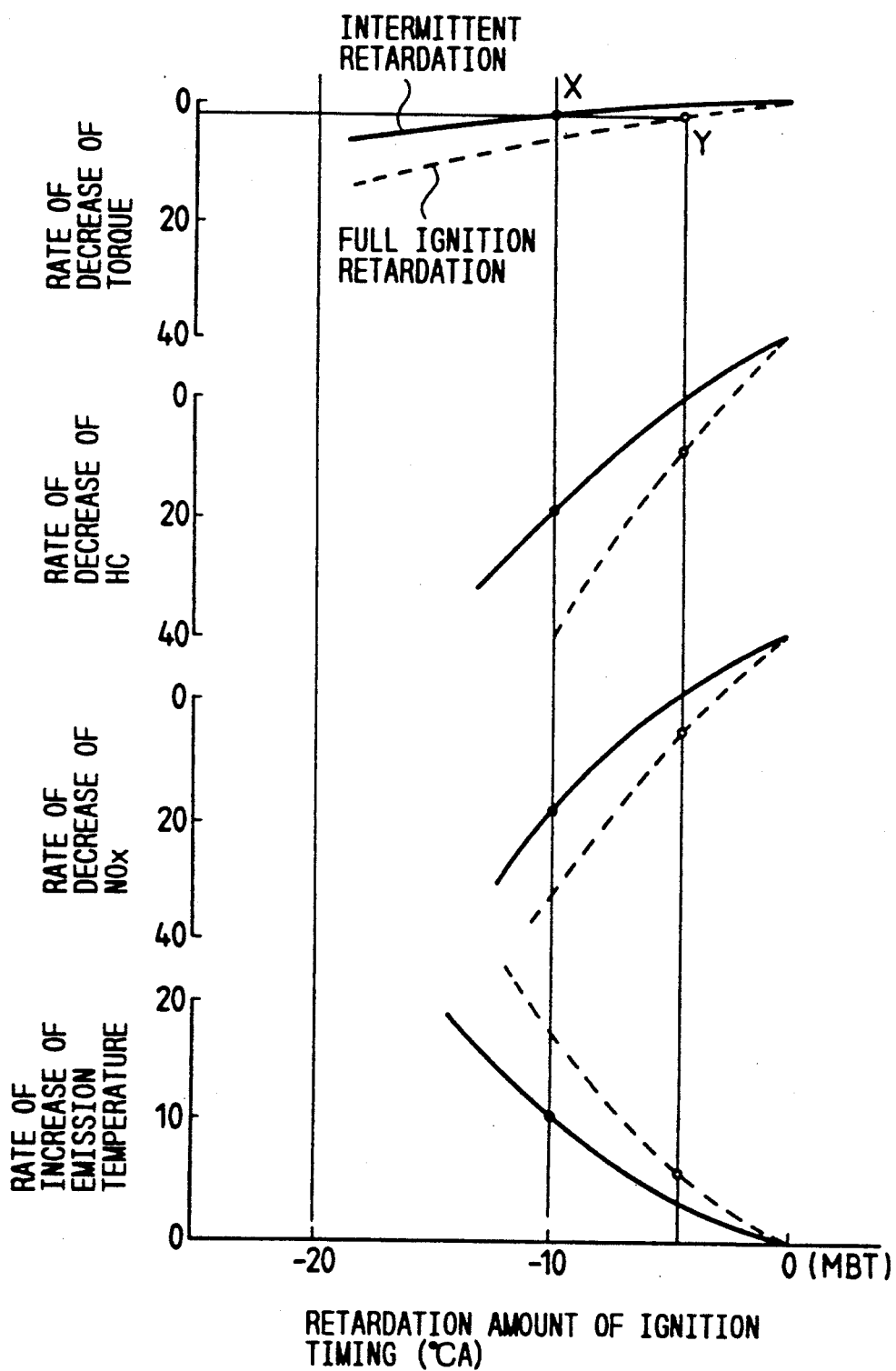
FIG. 2 is a characteristic graph showing the rate of increase of the emission temperature and the rate of decrease of the emissions in both the cases that the ignition timing is retarded in all the ignition cycles and the ignition timing is retarded intermittently, while a catalytic converter rhodium is warmed up.

FIG. 2 shows the rate of increase of the emission temperature and the rate of decrease of the emissions in both the cases that the ignition timing is retarded in all the ignition cycles and the ignition timing is retarded intermittently (every other ignition cycle) while the catalytic converter rhodium 38 is warmed up. Although the engine torque decreases in response to the retardation of the ignition timing, in the case that both are compared with each other at the same torque decreasing point (X, Y), as compared with the case of the retardation of all the ignition timings, the intermittent retardation of the ignition timings allows the rate of decrease of the emission and the rate of increase of the emission temperature to be more heightened. Thus, the intermittent retardation causes the catalyst to be warmed up in an earlier stage as compared with the retardation of all the ignition timings, thereby suppressing the deterioration of the emissions.

ii) Method based upon Fuel Injection Dither Control

The fuel injection amount is more increased at every combustion cycle so as to shift the air-fuel ratio between the rich side and the lean side with respect to the theoretical air-fuel ratio to alternately perform the rich combustion and the lean combustion. Here, carbon monoxide (CO) is generated at the time of the rich combustion and oxygen ($O_2$) is generated at the time of the lean combustion. The carbon monoxide and oxygen thus generated cause the oxidative reaction as indicated by the following formula, thereby generating a heat (Q).

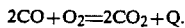
$$2CO + O_2 = 2CO_2 + Q.$$

The heat (Q) generated due to this oxidative reaction allows the increase in the emission temperature to accelerate the warming-up of the catalytic converter rhodium 38.

This embodiment of this invention is arranged so as to warm up the catalytic converter rhodium in accordance with both the methods i) and ii).

Figure 3:
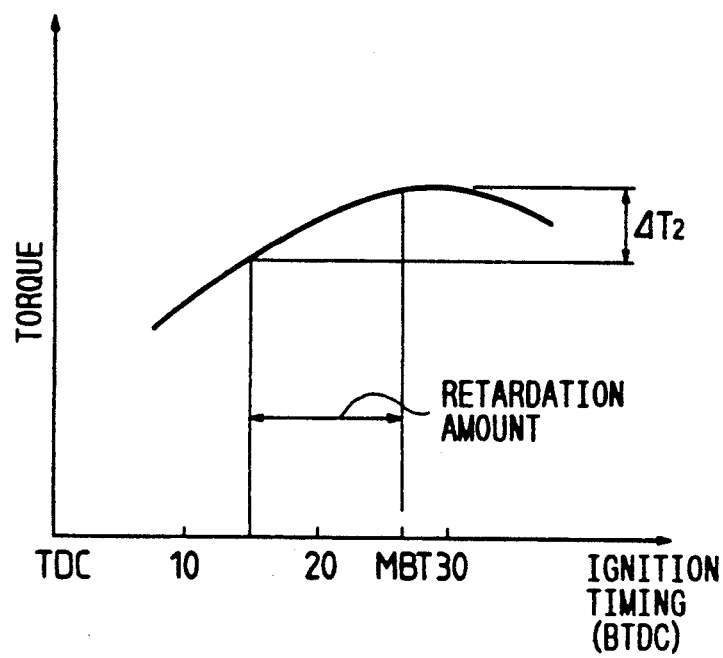
FIGS. 3 and 4 are graphic illustrations for describing variations of the engine torque due to the retardation control of the ignition timing and the fuel injection dither control.
Figure 4:
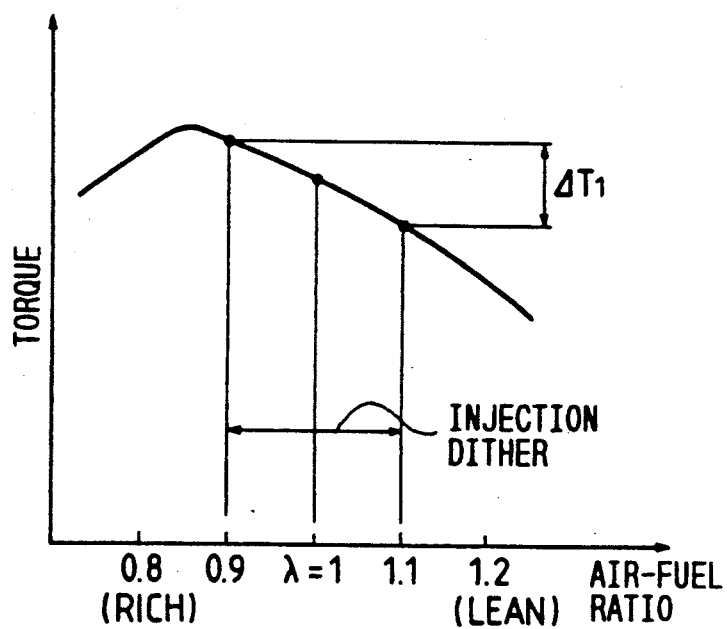

Here, the above-described retardation control and fuel injection dither control respectively cause variation of the engine torque as illustrated in FIGS. 3 and 4, and therefore both the control operations are required to be executed with the variation of the engine torque being suppressed. That is, when the air-fuel ratio is shifted (adjusted) to the rich side with respect to the theoretical air-fuel ratio ($\lambda = 1$) to increase the torque, the ignition timing is shifted from MBT to TDC (top dead center) side, i.e., retarded, to decrease the torque so as to suppress the torque variation. On the other hand, when the air-fuel ratio is shifted to the lean side to decrease the torque, the retardation amount of the ignition timing is reduced, thereby increasing the torque to suppress the torque variation. At this time, if the dither range and the retardation amount are set so that the variation $\Delta T1$ of the torque due to the injection dither control becomes equal or close to the variation $\Delta T2$ due to the retardation control, it is possible to minimize the deterioration of the driveability caused by the torque variation.

Figure 5:
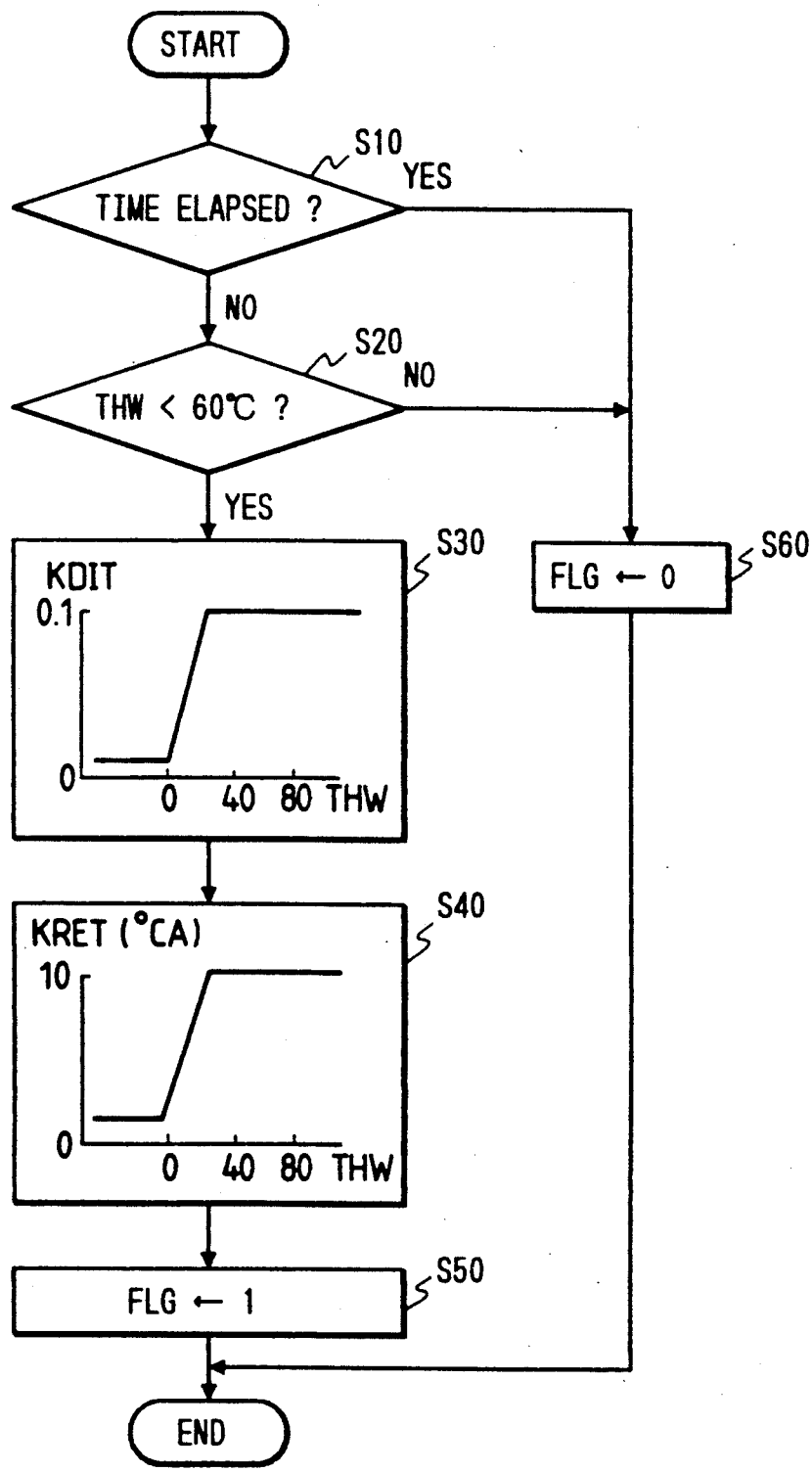
FIGS. 5 to 7 are flow charts for describing the intermittent retardation control and the injection dither control to be executed in a first embodiment of this invention.

Secondly, a description will be made hereinbelow with reference to FIGS. 5 to 7 in terms of the intermittent retardation control and the injection dither control to be executed in the electronic control unit 20. FIG. 5 shows a routine for calculating an injection dither coefficient KDIT and an intermittent retardation amount KRET, which routine is executed at every 40 ms. In FIG. 5, this routine starts with a step 10 (the step will be referred hereinafter to as S10) to check whether a predetermined time period is elapsed from the start of the engine 10 (for example, Ne > 500 rpm). This predetermined time period is a time period taken until the temperature of the catalytic converter rhodium 38 reaches the temperature at which the purification of the emissions can be effected and, for example, set to 100 seconds. If the decision of S10 is "NO", S20 follows to read the cooling water temperature THW to check whether the cooling water temperature THW is lower than 60° C. If "YES", control advances to S30 and S40 to calculate the dither coefficient KDIT and the intermittent retardation amount KRET on the basis of the cooling water temperature THW in accordance with data previously stored in the ROM 22. The dither coefficient KDIT takes a value in a range of 0 to 0.1 and takes a greater value as the cooling water temperature THW becomes higher. This is because the misfire region in relation to the air-fuel ratio becomes wider as the cooling water temperature THW becomes lower and, although the air-fuel ratio cannot be shifted greatly to the rich side and lean side when the temperature is low, the air-fuel ratio can relatively be shifted greatly thereto as compared with the case of the low temperature when the cooling water temperature THW heightens. Further, the intermittent retardation amount KRET takes a value in a range of 0° to 10° CA and takes a greater value as the cooling water temperature THW becomes higher. This is because the torque variation due to the dither control is set to be substantially equal to the torque variation due to the intermittent retardation control in order to cancel the variation of the torque as described with reference to FIGS. 3 and 4. After the calculations of the injection dither coefficient KDIT and the intermittent retardation amount KRET in S30 and S40, S50 is then executed to set a decision flag FLG (FLG←1) which flag indicates whether the execution conditions for injection dither control and the intermittent retardation control are satisfied, thereafter terminating this routine. On the other hand, if the decision of S10 is made such that the predetermined time period has been elapsed from the start or the decision of S20 is made such that the cooling water temperature THW is above 60° C., the operational flow goes to S60 to clear the decision flag FLG (FLG←0), thereafter terminating this routine.

Further, a description will be made hereinbelow with reference to a flow chart of FIGS. 6 and 7 in terms of calculations of the final injection amount TAU and the final ignition timing AESA. This routine is started at every 180° CA (top dead center of each of cylinders). In FIGS. 6 and 7, S100 and S110 are first executed in order to read the engine rotational speed Ne and the intake air pressure PM, then followed by S120 to check whether the decision flag FLG is in the set state. If the decision flag FLG is set, S130 follows to check whether a specific condition is satisfied. Here, the specific condition means that the engine is not operated in a high-speed region or large-load region where the injection amount is set to the rich side with respect to the theoretical air-fuel ratio ($\lambda = 1$) or not operated in a small-load region or low-speed region where the combustion is unstable. When satisfying the specific condition, S140 follows to calculate dither correction amounts KNE and KPM for correction of the dither coefficient KDIT on the basis of the engine rotational speed Ne and the intake air pressure PM in accordance with maps, respectively. The data is stored in advance in the ROM 22.

After the calculations of the dither correction amounts KNE and KPM in S140, S150 is executed to check whether a dither confirmation flag RFLG is set which indicates whether the air-fuel ratio has been shifted to the rich side or lean side in the previous cycle. When the flag RFLG is set (RFLG=1), i.e., when the air-fuel ratio is shifted to the lean side in the previous cycle, S180 is executed so as to perform the process for setting the air-fuel ratio to the rich side in the present cycle. In S180 the final dither coefficient TDit is calculated in accordance with the following equation.

$$TDit = 1 + KDIT \cdot KNE \cdot KPM.$$

After the calculation of the final dither coefficient TDit in S180, A190 follows to reset the flag RFLG (RFLG←..0), thereafter advancing to S200. On the other hand, if in S150 the flag RFLG is reset, that is, when the air-fuel ratio is shifted to the rich side in the previous cycle, S160 is executed in order to perform the process for setting the air-fuel ratio to the lean side in the present cycle. In S160 the final dither coefficient TDit is calculated in accordance with the following equation.

$$TDit = 1 - KDIT \cdot KNE \cdot KPM.$$

After the calculation of the final dither coefficient TDit in S160, S170 follows to set the flag RFLG (RFLG←1), thereafter advancing to S200. In S200, correction amounts KRNE and KRPM for correction of the intermittent retardation amount KRET are calculated on the basis of the engine rotational speed Ne and the intake air pressure PM in accordance with maps, respectively. The maps is in advance stored in the ROM 22. In response to the calculations of the correction amounts KRNE and KRPM in S200, S210 follows to check whether the previous final dither coefficient TDitx is greater than 1 in order to determine whether the previously calculated air-fuel ratio has been set to the rich side. When TDitx is smaller than 1, that is, in the case that the previous air-fuel ratio is set to the lean side (as described with FIG. 4) so that the torque decreases, for suppressing the torque variation, S220 is executed so as to set the final retardation amount ARET to 0 whereby the ignition timing is not retarded. On the other hand, when S210 decides that TDitx is above 1, that is, in the case that the previous air-fuel ratio is set to the rich side to increase the torque, the ignition timing is retarded in order to suppress the torque variation. Thus, in S230 the final retardation amount ARET is calculated in accordance with the following equation.

$$ARET = KRET \cdot KRNE \cdot KRPM.$$

In response to the calculation of the final retardation amount ARET, S240 is executed to calculate the basic injection amount TP and the basic ignition timing ABSE in accordance with a two-dimensional map based on the engine rotational speed Ne and the intake air pressure PM. Further, S250 follows to calculate the final injection amount TAU by multiplying the final dither correction coefficient TDit and a basic injection amount correction coefficient FC by the basic injection amount TP and further adding an invalid injection time correction value TV to the multiplication result as indicated by the following equation.

$$TAU = TP \cdot TDit \cdot FC + TV.$$

Thereafter, S260 is executed so as to calculate the final ignition timing AESA by adding a basic ignition timing correction amount C to the basic ignition timing ABSE and subtracting the final retardation amount ARET from the addition result as indicated by the following equation.

$$AESA = ABSE + C - ARET.$$

Here, the final ignition timing AESA is indicative of an angle of BTDC (before top dead center).

After the calculation of the final ignition timing as described above, S270 is executed to rewrite TDit to TDitx, thereafter terminating this routine.

On the other hand, when in S120 the flag FLG is reset, that is, in the case that the execution condition of the injection dither and intermittent retardation control is not satisfied, or in the case that in S130 the specific condition is not satisfied, S280 follows to set the final dither correction coefficient TDit to 1, then followed by S290 to set the final retardation amount ARET to 0. Thus, when the decision of S120 or S130 is "NO", in S250 and S260 the dither control is not executed with respect to the injection amount and the intermittent retardation control is not effected with respect to the ignition timing.

As described above, the air-fuel ratio is shifted to the rich and lean sides at every combustion, and the retardation control of the ignition timing is performed (every other ignition cycle) only when the air-fuel ratio is shifted to the rich side.

The above-described consecutive operations of the electronic control unit 20 will be described with reference to a time chart of FIG. 8 where INT represents an intake stroke, COM designates a compression stroke, EXP depicts an explosion stroke and EXH denotes an exhaust stroke. In FIG. 8, a signal A is a crank position signal to be generated at every 180°CA (one per 6 signals each being generated at every 30°CA) and generated at the top dead center of each of the engine cylinders, signals B to E are injection pulse signals for respectively driving the injectors 16a, 16c, 16d and 16b provided in the first, third, fourth and second cylinders, and a signal F indicates an ignition pulse signal. The routine shown in FIGS. 6 and 7 is started in response to each input of the signal A. Now, let it be assumed that the routine shown in FIGS. 6 and 7 starts at the time e. After elapsed by several tens microseconds from the time e (after the completion of the routine of FIGS. 6 and 7), an injection signal corresponding to the final injection amount TAU calculated in S250 is outputted to the third cylinder. Here, the final ignition timing AESA calculated in S260 of the routine started at the time e is the ignition timing corresponding to the first-cylinder final injection amount TAU calculated at the time of the previous start (the time d). That is, the final ignition timing AESA calculated in the routine started at the time e corresponds to the time f, and the time f is the time that the first-cylinder final injection amount TAU calculated in the routine started at the time d is injected during the intake stroke of the first cylinder before completing the compression stroke. Thus, the ignition signal at the time f is led to the first-cylinder ignition plug 18a whereby the first cylinder takes the explosion stroke. Similarly, the final injection amount TAU calculated in the routine started at the time g is for the fourth cylinder, and the final ignition timing AESA calculated at that time is for the third cylinder.

Thus, the cylinder into which the rich-side final injection amount TAU is injected is ignited at the final ignition timing AESA retarded, and the cylinder into which the lean-side final injection amount TAU is injected is ignited at the final ignition timing AESA which is not retarded. The final injection amount TAU is alternately shifted to the lean and rich sides in order of the first, third, fourth and second cylinders, and the ignition timing is intermittently retarded at every other ignition cycle.

Although in the above-described embodiment the injection amount is shifted to the rich and lean sides at every injection cycle, it is appropriate that the injection amount is shifted to the rich and lean sides at every two injection cycles. At this time, the ignition timing is intermittently retarded only when it is shifted to the rich side, thereby suppressing the variation of the torque. Further, it is also appropriate that the fuel injection amount is not shifted to the lean and rich sides at every predetermined injection cycles, but the fuel injection amount is shifted to the lean and rich sides at every predetermined time period and the ignition timing is intermittently retarded at every predetermined time period.

Figure 6:
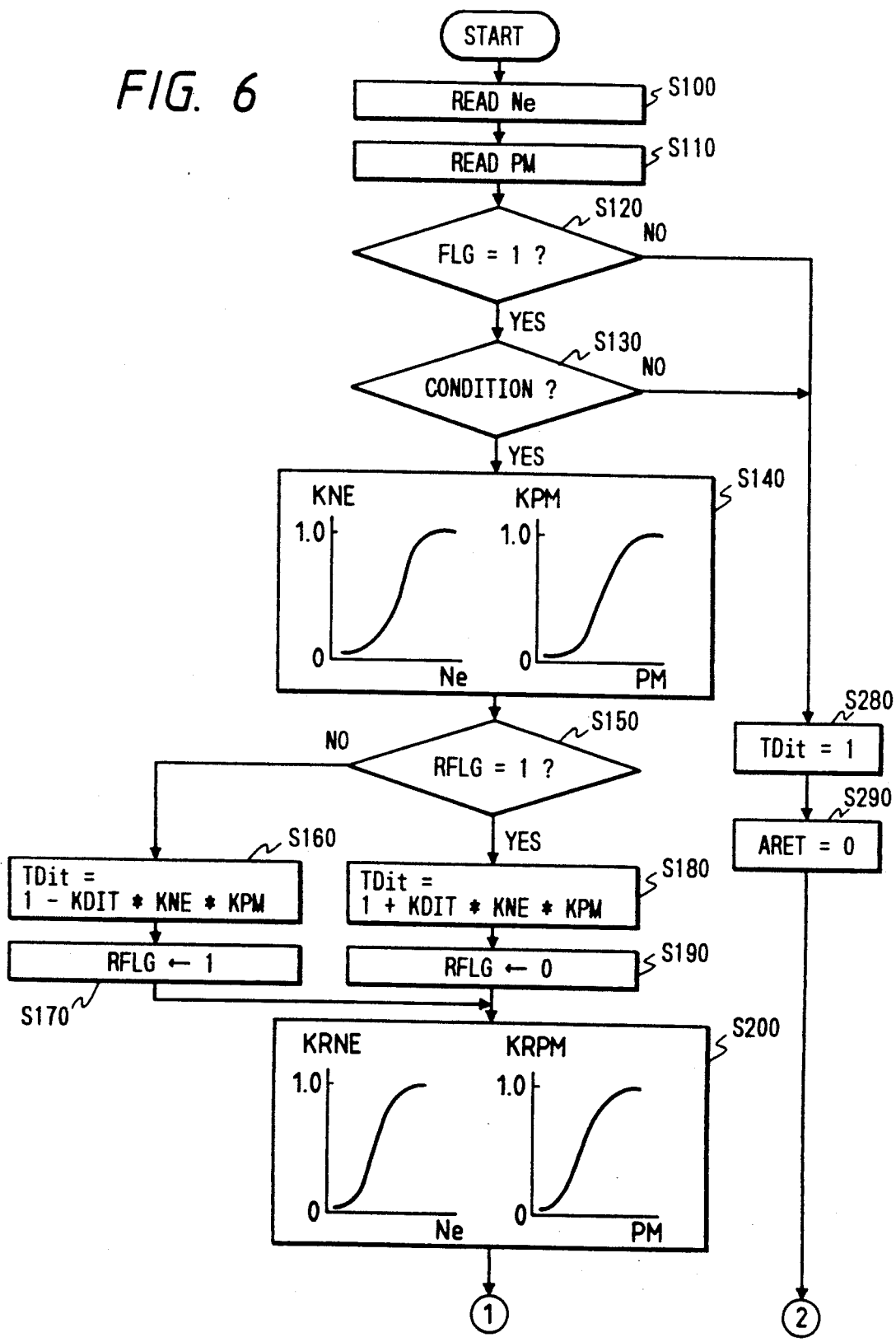
Figure 7:
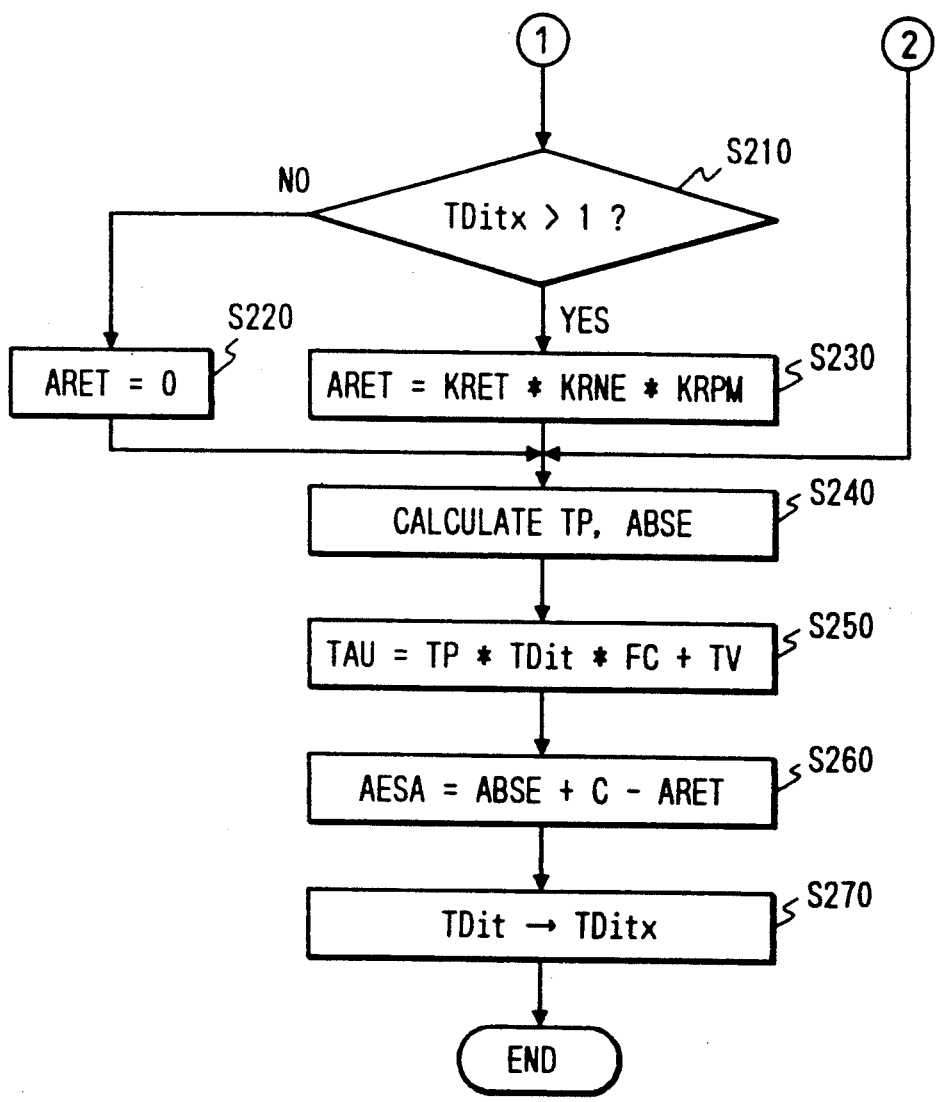
Figure 8:
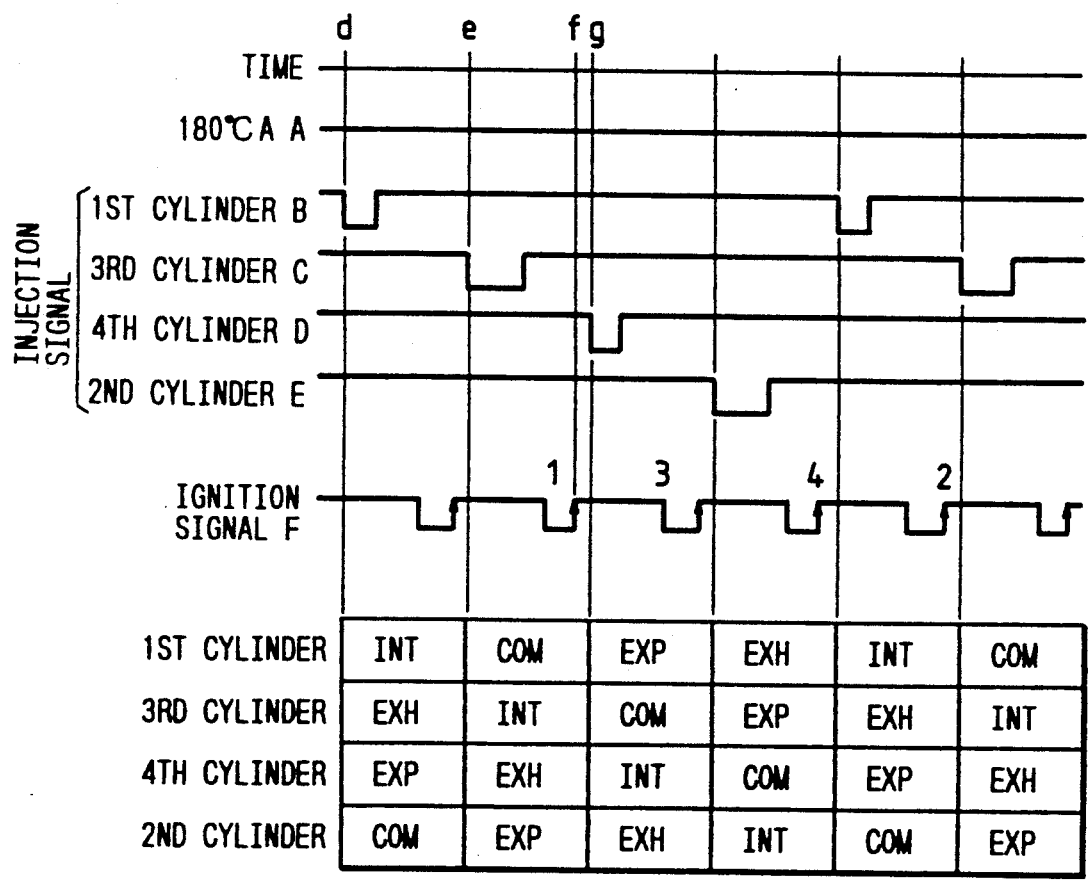
FIG. 8 is a timing chart of ignition and injection for describing the first embodiment of this invention.
Figure 9:
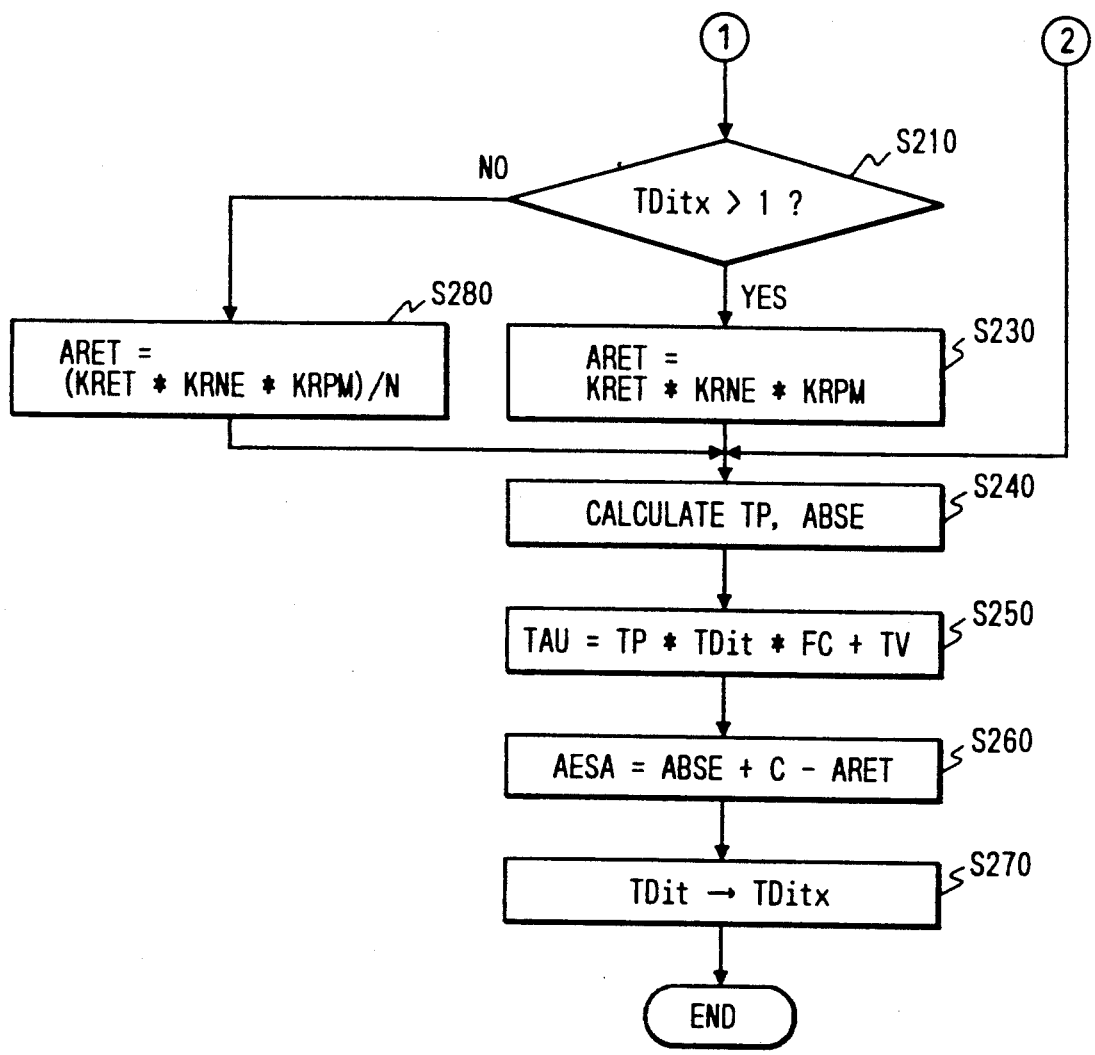
FIG. 9 is a flow chart showing an operation according to a second embodiment of the present invention.

FIG. 9 is a flow chart showing a second embodiment of the present invention where steps corresponding to those of FIGS. 6 and 7 are indicated with the same marks and the description thereof will be omitted for brevity. As shown in FIG. 9, when the previous air-fuel ratio is shifted to the lean side, that is, when the decision of S210 is made such that the previous final dither correction coefficient TDit is below 1, S280 is executed in order to calculate the final retardation amount ARET in accordance with the following equation.

$$ARET = (KRET \cdot KRNE \cdot KRPM)/N$$

This value corresponds to 1/N of the retardation amount (KRET·KRNE·KRPM) calculated in S230 when the air-fuel ratio is shifted to the rich side. For example, N is set to 5. That is, when the air-fuel ratio is shifted to the lean side, the ignition timing is retarded by 1/5 of the retardation amount calculated in the case of being shifted to the rich side. The other operations are similar to those in FIG. 7.

Furthermore, a description will be made hereinbelow in terms of a third embodiment of this invention which is for a group injection system. In view of the quick warming-up of the catalyst and improvement of the emissions, the effect is greater as the injection dither amount and the intermittent retardation amount becomes larger, while, considering the margin of misfire, fuel consumption, torque and others, the small injection dither amount and intermittent retardation amount is preferable. From both the viewpoints, as a result of the tests, this applicant confirmed the fact that it is preferable that the injection amount is shifted by about ±10% and the ignition timing is intermittently retarded by about 10°CA. However, since the torque variation in the case that the injection amount is shifted by about ±10% is smaller than the torque variation in the case that the ignition timing is retarded by 10°CA, the ignition timing retardation becomes great as the torque variation factor and the torque variation can be accelerated when continued so as to result in deterioration of the driveability. Accordingly, in a group injection system where 2 ignitions are effected with respect to one injection, the retardation for 2 ignitions is not performed at every injection (when being shifted to the rich side) but only one of two ignition timings per one injection is retarded. This can more effectively suppress the torque variation. That is, the period of the intermittent retardation is not set to be equal to the period of the injection, but set to be shorter than the period of the injection, whereby the torque variation can be suppressed.

Figure 10:
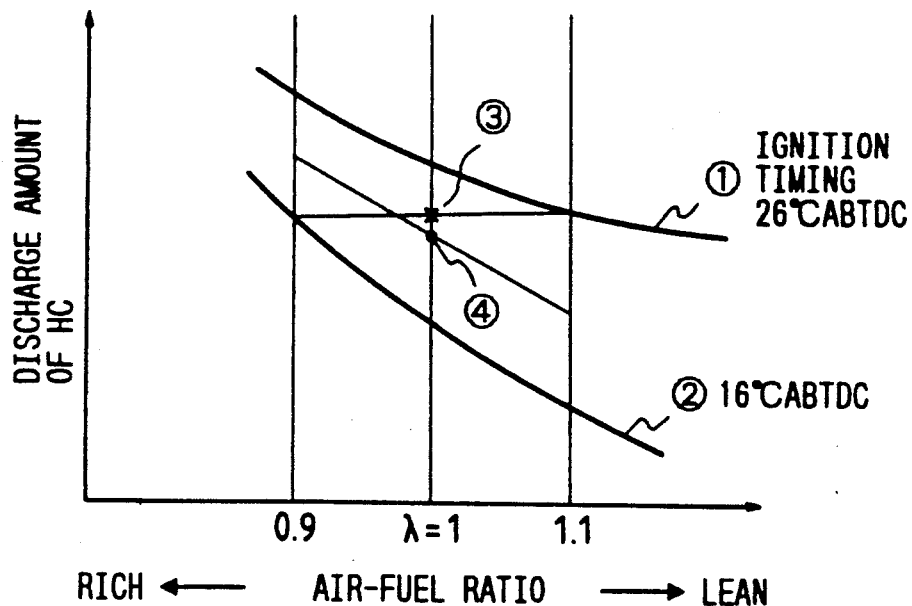
FIG. 10 is a graphic illustration for describing the relation between the retardation of the ignition timing and the discharge amount of HC.
Figure 11:
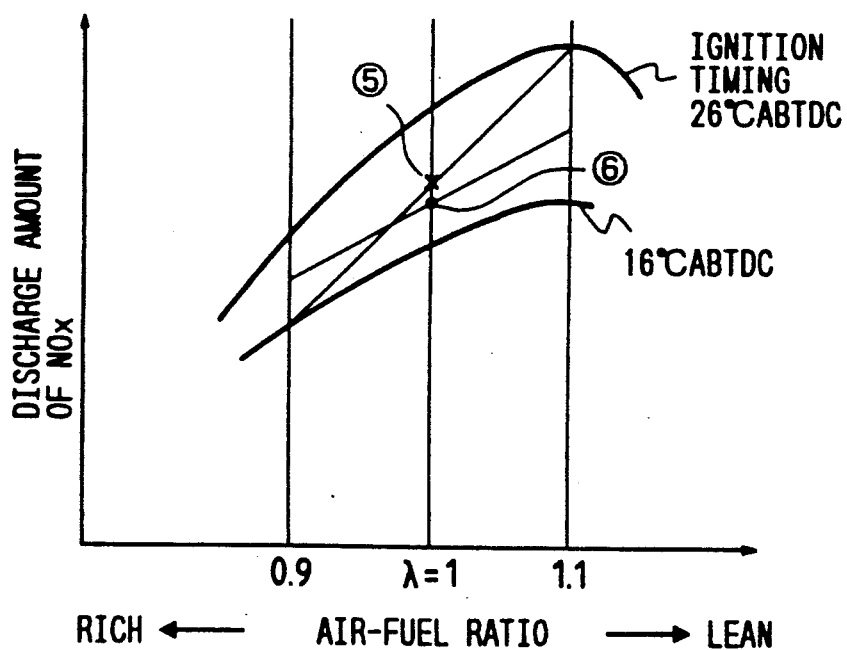
FIG. 11 is a graphic illustration for describing the relation between the retardation of the ignition timing and the discharge amount of NOx.

The states of the emissions in the case that the intermittent retardation period is set to be shorter than the injection period are shown in FIGS. 10 and 11. In FIG. 10, numeral 1 surrounded by a circle designates an HC discharge amount in the case of retardation, numeral 2 surrounded by a circle denotes an HC discharge amount in the case of no retardation, and numeral 3 surrounded by a circle represents the average value of HC discharge amounts in the case of being retarded when the air-fuel ratio is shifted to the rich side and not retarded when it is shifted to the lean side. This average value of the HC discharge amounts becomes greater than the average value (numeral 4 surrounded by a circle) of the discharge amounts in the case that the ignition timing is retarded and non-retarded while the air-fuel ratio is shifted to the rich and lean sides. That is, the HC discharge amount can be more reduced when the ignition timing retardation period is set to be shorter than the injection period.

Similarly, as illustrated in FIG. 11, in terms of NOx discharge amount, the average value (numeral 5 surrounded by a circle) of the NOx discharge amounts in the case that the ignition timing is retarded when the air-fuel ratio is shifted to the rich side and not retarded when the air-fuel ratio is shifted to the lean side becomes greater than the average value (numeral 6 surrounded by a circle) of the NOx discharge amounts in the case that the ignition timing is retarded and non-retarded while the air-fuel ratio is shifted to the rich and leans sides. That is, the NOx can be more reduced in the case that the ignition timing retardation period is set to be shorter than the injection period.

Secondly, a description will be made with reference to a flow chart of FIGS. 12 and 13 in terms of the injection control and the ignition timing control in the group injection system. Here, the outline of the group injection system is substantially similar to the arrangement illustrated in FIG. 1, and one difference therebetween is that the two injectors 16a and 16c simultaneously inject fuel at every 720°CA and the remaining two injectors 16b and 16d simultaneously inject fuel at the timing shifted by 360° with respect to the two injectors 16a and 16c. The routine for calculating the injection dither coefficient KDIT and the intermittent retardation amount KRET is similar to that of FIG. 5. The injection dither coefficient KDIT and the intermittent retardation amount KRET are set to values (dither amount 10%, retardation amount 10°CA) which are effective values in view of the catalyst warming-up and the emission improvement in the case that the water temperature THW is 20° C.

Figure 12:
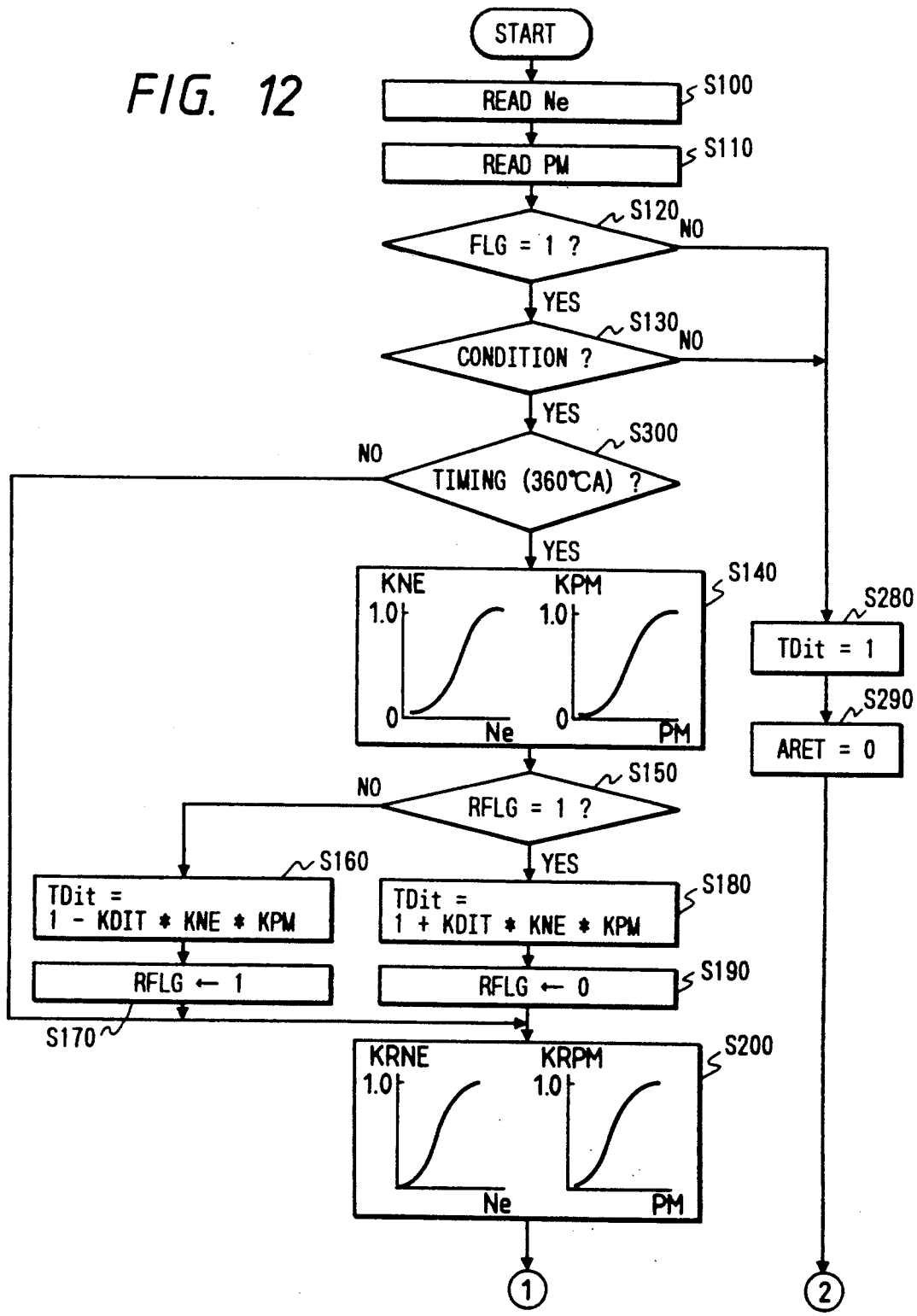
FIGS. 12 and 13 show a flow chart for describing the injection control and the ignition timing control of a group injection system in a third embodiment of this invention.
Figure 13:
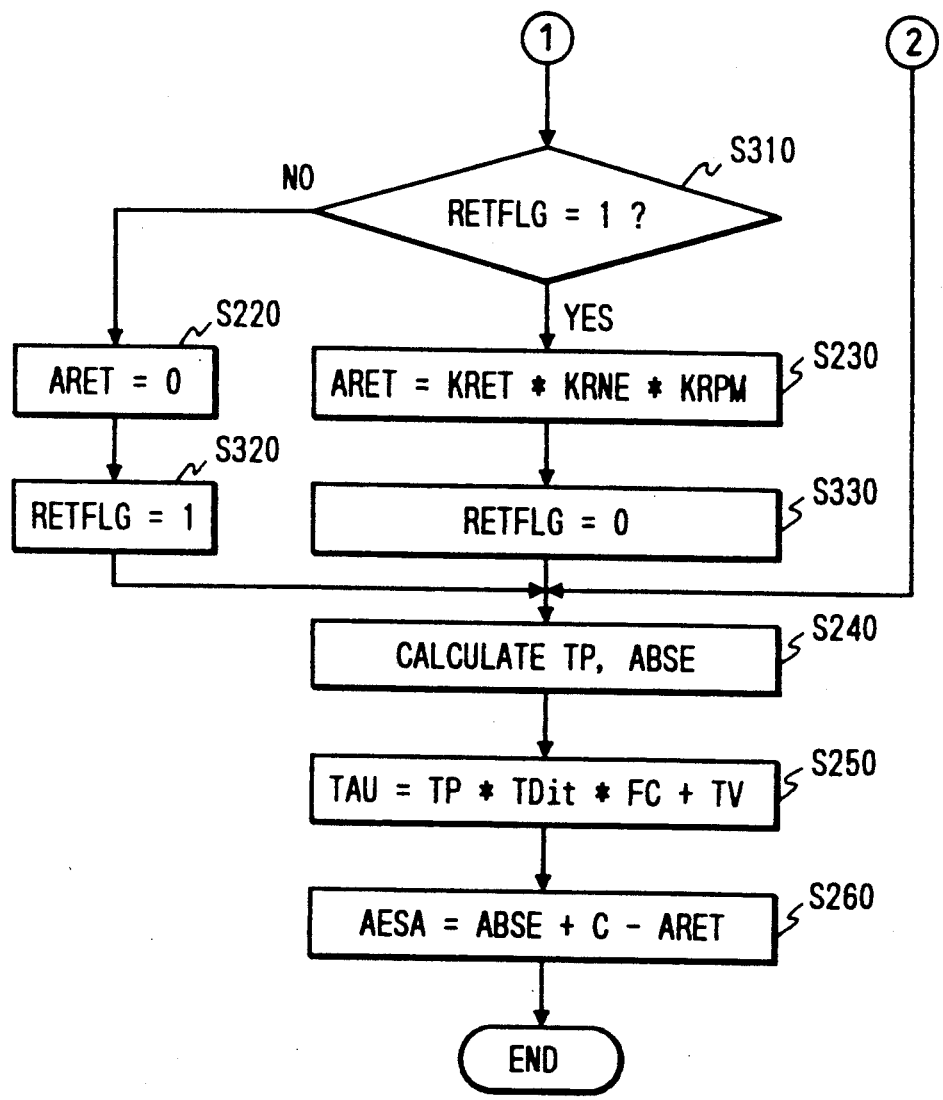

The routine shown in FIG. 12 is started and executed at every 180°CA where parts corresponding to those in FIG. 6 are indicated by the same marks and the description thereof will be omitted. One difference point is that S300 is further added between S130 and S140. S300 is a step for checking whether now is the injection timing determined at every 360°CA. That is, S300 is a decision precess for effecting the injection dither process in the steps S140 to S190 at every 360°CA. In the routine of FIG. 13 subsequent to the FIG. 12 routine, S310 is executed in order to check whether an ignition timing decision flag RETFLG is in the set state. If being in the set state, the decision is made such that the retardation is not performed in the previous cycle and hence S230 follows to set the final retardation amount ARET, then followed by S330 to reset the flag RETFLG. On the other hand, if the decision of S310 is made such that the flag RETFLG is not in the set state, that is, in the case of retardation in the previous cycle, the final retardation amount ARET is set to 0 in S220, then followed by S320 to set the flag RETFLG, thereafter executing S240 to S260.

Figure 14:
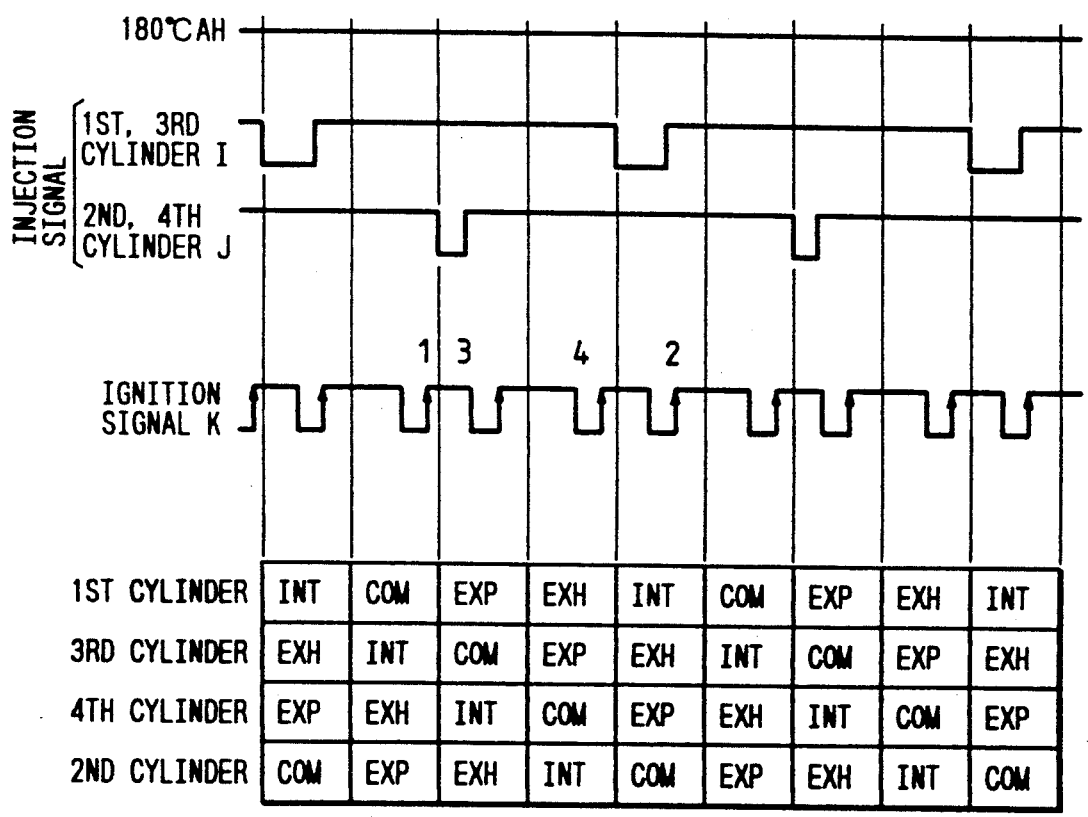
FIG. 14 is a timing chart showing injection signals and an ignition signal in the group injection system.

As described above, according to this embodiment, the air-fuel ratio is shifted to the rich and lean sides at every 360° CA and the ignition timing is intermittently retarded at every 180° CA FIG. 14 is a timing chart for describing the output states of the injection signals and the ignition signal in the above-described group injection system. In FIG. 14, signals I and J are respectively injection signals for the first, third cylinders and the second, fourth cylinders. The signals I and J are respectively generated at every 720° CA and shifted by 360° from each other. The injection signal is shifted to the rich and lean sides at every 360° CA and as a result the rich signal is always outputted with respect to the first and third cylinders and the lean signal is always outputted with respect to the second and fourth cylinders. Further, the ignition signal is intermittently retarded at every 180° CA, i.e. every one ignition. More specifically, when the injection signal shifted to the rich side is outputted to the first and third cylinders, the first-cylinder ignition timing is retarded but the third-cylinder ignition timing is not retarded.

As described above, with the ignition retardation period being set to be shorter than the rich and lean period of the injection signal in the group injection system, it is possible to perform the control based on the retardation amount and the injection dither amount which allow great catalyst warming-up and emission improvement effects, and further to accelerate the suppression of the torque variation and the emission improvement. This embodiment is not limited to the group injection system but is applicable to a simultaneous injection system. The similar effect can be obtained.

Further, although in the above-described embodiments both the injection dither control and intermittent retardation control are executed, it is also possible to shorten the time period that the catalyst takes the full intake state even if executing the injection dither control only or the intermittent retardation control only, thus suppressing the deterioration of the emissions. In addition, in the case of executing the injection dither control only or the intermittent retardation control only, if limiting to an operating region such as a large-load region, a middle rotational speed region in which the affection of the torque variation due to the control is small, it is possible to prevent the deterioration of the driveability.

According to the above-described embodiments, when the warming-up of the catalyst is not completed, the engine alternately takes the rich combustion and the lean combustion so as to generate heat through the oxidative reaction of the carbon monoxide and oxygen produced thereby. The generated heat heats the catalyst which is in turn warmed up speedily so as to improve the emission purifying efficiency of the catalyst to thereby suppress the deterioration of the emissions.

Moreover, since the ignition timing is intermittently retarded at the time of no completion of the warming-up of the catalyst, the warming-up of the catalyst can be accelerated so as to similarly suppress the deterioration of the emissions.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. An internal combustion engine control apparatus comprising:
engine operating condition detecting means for detecting an operating condition of an internal combustion engine;
fuel injection amount determining means for determining an appropriate fuel injection amount to obtain an appropriate air-fuel ratio based on said engine operating condition detected by said engine operating condition detecting means;
temperature condition determining means for determining if a temperature of a catalyst disposed within an exhaust pipe coupled to said engine for purifying emissions generated from said engine reaches an operating temperature at which said catalyst effectively purifies said emissions; and
adjusting means for alternately adjusting said fuel injection amount when said temperature condition determining means determines that said catalyst temperature is lower than said operating temperature to alternately adjust said fuel injection amount to a rich amount and a lean amount with respect to said air-fuel ratio to supply to said catalyst excessive oxygen when lean combustion occurs in said engine and excessive carbon monoxide when rich combustion occurs in said engine, respectively, to cause an oxidative reaction within said catalyst to increase said temperature of said catalyst.

2. An internal combustion engine control apparatus according to claim 1, wherein said engine condition detecting means includes an intake air pressure sensor for detecting an intake air pressure and an engine rotational speed sensor for detecting an engine rotational speed.

3. An internal combustion engine control apparatus according to claim 1, wherein said temperature condition determining means includes timer means for determining whether a predetermined time period elapses from the start of said engine.

4. An internal combustion engine control apparatus according to claim 1, wherein said temperature condition determining means includes an engine coolant temperature sensor for detecting an engine coolant temperature so as to determine whether the engine coolant temperature becomes a predetermined value.

5. An internal combustion engine control apparatus comprising:
engine operating condition detecting means for detecting an operating condition of an internal combustion engine;
fuel injection amount determining means for determining an appropriate fuel injection amount to obtain an appropriate air-fuel ratio based on said engine operating condition detected by said engine operating condition detecting means;

temperature condition determining means for determining if a temperature of a catalyst disposed within an exhaust pipe connected to said engine for purifying emissions generated from said engine reaches an operating temperature at which said catalyst effectively purifies said emissions; and adjusting means for alternately adjusting said fuel injection amount when said temperature condition determining means determines that said catalyst temperature is lower than said operating temperature to alternately adjust said fuel injection amount to a rich amount and a lean amount in accordance with said air-fuel ratio, said adjusting means changing said fuel injection amount from one of said rich amount to said lean amount and said lean amount to said rich amount every injection cycle.

6. An internal combustion engine control apparatus comprising:

engine operating condition detecting means for detecting an operating condition of an internal combustion engine;

ignition timing determining means for determining an appropriate ignition timing of said engine based on said engine operating condition detected by said engine operating condition detecting means;

temperature condition determining means for determining if a temperature of a catalyst disposed within an exhaust pipe connected to said engine for purifying emissions generated from said engine reaches an operating temperature at which said catalyst effectively purifies said emissions; and retarding means for intermittently retarding said determined ignition timing when said temperature condition determining means determines that said catalyst temperature is below said operating temperature, said retarding means retarding the determined ignition timing every other ignition cycle.

7. An internal combustion engine control apparatus according to claim 6, wherein said engine condition detecting means includes an intake air pressure sensor for detecting an intake air pressure and an engine rotational speed sensor for detecting an engine rotational speed.

8. An internal combustion engine control apparatus according to claim 6, wherein said temperature condition determining means includes timer means for determining if a predetermined time period elapses from starting of said engine.

9. An internal combustion engine control apparatus according to claim 6, wherein said temperature condition determining means includes an engine coolant temperature sensor for detecting an engine coolant temperature so as to determine if said engine coolant temperature reaches a predetermined value.

10. An internal combustion engine control apparatus comprising:

engine operating condition detecting means for detecting means for detecting an operating condition of an internal combustion engine;

fuel injection amount determining means for determining an appropriate fuel injection amount to obtain an appropriate air-fuel ratio based on said engine operating condition detected by said engine operating condition detecting means;

ignition timing determining means for determining an appropriate ignition timing of said engine based on said engine operating condition detected by said engine operating condition detecting means;

temperature condition determining means for determining if a temperature of a catalyst disposed within an exhaust pipe connected to said engine for purifying emissions generated from said engine reaches an operating temperature at which said catalyst effectively purifies said emissions;

adjusting means for alternately adjusting said fuel injection amount when said temperature condition determining means determines that said catalyst temperature is lower than said operating temperature to alternately adjust said fuel injection amount to a rich amount and a lean amount with respect to said air-fuel ratio to supply to said catalyst excessive oxygen when lean combustion occurs in said engine and excessive carbon monoxide when rich combustion occurs in said engine, respectively, to cause an oxidative reaction within said catalyst to increase said temperature of said catalyst; and retarding means for retarding said ignition timing when said adjusting means adjusts said fuel injection amount to said rich amount.

11. An internal combustion engine control apparatus according to claim 10, wherein said fuel injection amount determining means determines said fuel injection amount to obtain a stoichiomitric air-fuel ratio.

12. An internal combustion engine control apparatus according to claim 10, wherein said engine operating condition detecting means includes an intake air pressure sensor for detecting an intake air pressure and an engine rotational speed sensor for detecting an engine rotational speed.

13. An internal combustion engine control apparatus according to claim 10, wherein said temperature condition determining means includes timer means for determining whether a predetermined time period elapses from the start of said engine.

14. An internal combustion engine control apparatus according to claim 10, wherein said temperature condition determining means includes an engine coolant temperature sensor for detecting an engine coolant temperature to determine if said engine coolant temperature reaches a predetermined value.

15. An internal combustion engine control apparatus comprising:

engine operating condition detecting means for detecting means for detecting an operating condition of an internal combustion engine;

fuel injection amount determining means for determining an appropriate fuel injection amount to obtain an appropriate air-fuel ratio based on said engine operating condition detected by said engine operating condition detecting means;

ignition timing determining means for determining an appropriate ignition timing of said engine based on said engine operating condition detected by said engine operating condition detecting means;

temperature condition determining means for determining if a temperature of a catalyst disposed within an exhaust pipe connected to said engine for purifying emissions generated from said engine reaches an operating temperature at which said catalyst effectively purifies said emissions;

adjusting means for alternately adjusting said fuel injection amount when said temperature condition determining means determines that said catalyst temperature is lower than said operating temperature to alternately adjust said fuel injection amount to a rich amount and a lean amount with respect to said air-fuel ratio; and retarding means for retarding said ignition timing when said adjusting means adjusts the fuel injection amount to said rich amount, said retarding means comprising:

first retarding means for retarding said ignition timing by a first predetermined angle to increase an engine torque when said fuel injection amount is adjusted to said lean amount; and second retarding means for regarding said ignition timing by a second predetermined angle, larger than said first predetermined angle, to reduce said engine torque when said fuel injection amount is adjusted to said rich amount.

16. An internal combustion engine control apparatus according to claim 10, wherein said retarding means retards said determined ignition timing only when said determined fuel amount is adjusted to said rich amount.

17. An internal combustion engine control apparatus comprising:

engine operating condition detecting means for detecting an operating condition of an internal combustion engine;

fuel injection amount determining means for determining an appropriate fuel injection amount with regard to a stoichiometric air-fuel ratio based on said engine operating condition detected by said engine operating condition detecting means;

ignition timing determining means for determining an appropriate ignition timing of said engine based on said engine operating condition detected by said engine operating condition detecting means;

temperature condition determining means for determining if a temperature of a catalyst disposed within an exhaust pipe coupled to said engine for purifying emissions generated from said engine reaches an operating temperature at which said catalyst effectively purifies said emissions;

adjusting means for alternately adjusting said fuel injection amount when said temperature condition determining means determines that said catalyst temperature is below said operating temperature to alternately adjust said fuel injection amount to a rich amount and a lean amount with respect to said stoichiometric air-fuel ratio at a first predetermined interval to supply to said catalyst excessive oxygen when lean combustion occurs in said engine and excessive carbon monoxide when rich combustion occurs in said engine, respectively, to cause an oxidative reaction within said catalyst to increase said temperature of said catalyst; and retarding means for retarding said ignition timing at a second predetermined interval, shorter than said first interval, while said catalyst temperature is below said operating temperature.

* * * * *